United States Patent
Jusick

(10) Patent No.: US 10,982,709 B2
(45) Date of Patent: Apr. 20, 2021

(54) REMOTE CONTROL ASSEMBLY

(71) Applicant: Kongsberg Driveline Systems I, Inc., Novi, MI (US)

(72) Inventor: Michael Jusick, Michigan Center, MI (US)

(73) Assignee: Kongsberg Driveline Systems I, Inc., Novi, MI (US)

(*) Notice: Subject to any disclaimer, the term of this patent is extended or adjusted under 35 U.S.C. 154(b) by 0 days.

(21) Appl. No.: 15/552,883

(22) PCT Filed: Feb. 27, 2015

(86) PCT No.: PCT/US2015/018067
§ 371 (c)(1),
(2) Date: Aug. 23, 2017

(87) PCT Pub. No.: WO2016/137504
PCT Pub. Date: Sep. 1, 2016

(65) Prior Publication Data
US 2018/0017096 A1 Jan. 18, 2018

(51) Int. Cl.
*F16C 1/24* (2006.01)
*F16C 1/10* (2006.01)
*F16C 1/26* (2006.01)

(52) U.S. Cl.
CPC ............... *F16C 1/24* (2013.01); *F16C 1/108* (2013.01); *F16C 1/26* (2013.01); *F16C 1/267* (2013.01)

(58) Field of Classification Search
CPC .. F16C 1/26; F16C 1/267; F16C 1/205; F16C 1/20; F16C 1/24; F16C 1/108; Y10T 74/20456; Y10T 74/20462; Y10T 74/2045
See application file for complete search history.

(56) References Cited

U.S. PATENT DOCUMENTS 3,177,901 A * 4/1965 Pierce ............... F16C 1/26
138/130
3,554,050 A * 1/1971 Conrad ............... F16C 1/10
138/133

(Continued)

FOREIGN PATENT DOCUMENTS

EP 0 438 745 A1 7/1991
EP 1 781 956 B1 3/2014
(Continued)

OTHER PUBLICATIONS

International Search Report for International Patent Application No. PCT/US2015/018067 completed on Oct. 15, 2015; 5 pages.
(Continued)

*Primary Examiner* — Daniel D Yabut
(74) *Attorney, Agent, or Firm* — Howard & Howard Attorneys PLLC

(57) ABSTRACT

A remote control assembly includes a sheath (22) having a longitudinal axis along a length thereof and defining an interior. A core element is disposed within the interior and extends along the length. A liner is disposed within the interior and coupled to the sheath (22). The liner surrounds the core element along the length. An outer layer (38) comprising a first material is coupled to the sheath (22). An intermediate layer (41) comprising a second material different from the first material is coupled to the outer layer (38). An inner layer (42) comprising a third material different from the first and second materials and is coupled to the intermediate layer (41). The second material of the intermediate layer (41) comprises an elastomeric material.

17 Claims, 6 Drawing Sheets

(56) References Cited

U.S. PATENT DOCUMENTS

| | | | | |
|---|---|---|---|---|
| 4,300,408 | A | * | 11/1981 | Yoshifuji .................. F16C 1/20 |
| | | | | 508/206 |
| 4,317,000 | A | * | 2/1982 | Ferer ...................... H01B 7/182 |
| | | | | 138/130 |
| 5,161,427 | A | | 11/1992 | Fukuda et al. |
| 5,199,320 | A | | 4/1993 | Spease et al. |
| 5,243,876 | A | | 9/1993 | Mang et al. |
| 5,245,887 | A | * | 9/1993 | Tanaka ...................... F16C 1/26 |
| | | | | 74/500.5 |
| 6,010,407 | A | | 1/2000 | Ishikawa |
| 6,148,689 | A | | 11/2000 | Uneme |
| 6,151,983 | A | | 11/2000 | Misaki et al. |
| 6,152,186 | A | * | 11/2000 | Arney ..................... F16L 11/08 |
| | | | | 138/122 |
| 6,347,561 | B2 | | 2/2002 | Uneme et al. |
| 6,646,204 | B2 | | 11/2003 | Chaon et al. |
| 8,356,530 | B2 | | 1/2013 | Hasegawa et al. |
| 8,497,427 | B2 | | 7/2013 | Wen |
| 8,511,201 | B2 | | 8/2013 | Cho et al. |
| 2002/0117323 | A1 | | 8/2002 | Chaon et al. |
| 2006/0053945 | A1 | | 3/2006 | Reynolds et al. |
| 2011/0041644 | A1 | | 2/2011 | Choi et al. |
| 2013/0087008 | A1 | | 4/2013 | Nishimura et al. |
| 2013/0139638 | A1 | * | 6/2013 | Lin ........................ F16C 1/205 |
| | | | | 74/502.5 |
| 2014/0047942 | A1 | | 2/2014 | Tsuda et al. |

FOREIGN PATENT DOCUMENTS

| | | |
|---|---|---|
| JP | S62 62013 A | 3/1987 |
| WO | WO 2006 016962 A | 2/2006 |

OTHER PUBLICATIONS

Written Opinion of the International Searching Authority for International Patent Application No. PCT/US2014/081256 completed on Oct. 15, 2015; 9 pages.

English language abstract and machine-assisted English language translation of Japanese Publication No. JP S62 62013 A extracted from www.espacenet.com on Aug. 8, 2017; 5 pages.

\* cited by examiner

REMOTE CONTROL ASSEMBLY

BACKGROUND OF THE INVENTION

1. Field of the Invention

The present invention generally relates to a remote control assembly.

2. Description of the Related Art

Various remote control assemblies have been developed for many applications. Typical use of remote control assemblies includes, but is not limited to, automotive applications such as control of automatic transmissions, accelerators, clutches, cruise controls, HVAC vents, and the like. Many of these applications include the transmission of motion in a curved path by a flexible transmitting core element slidably disposed in a conduit. These conduits typically include a liner, a sheath, and at least one wire for reinforcing the sheath about the liner.

During normal operation of the remote control assembly, the conduit is subjected to vibrations caused by engines, transmissions, and/or movement of the core element. Current designs fail to reduce or eliminate vibrations transmitted from the engine or transmission through the conduit, and at times fail to provide proper lubrication for the core element, which can reduce friction and vibrations caused by the core element slidably engaging the liner of the conduit.

As such, there remains an opportunity to design a liner and a conduit that further reduces vibrations transmitted through the conduit. In addition, there remains an opportunity to design a liner and a conduit that provides proper lubrication for reducing friction and vibration caused by the core element slidably engaging the liner of the conduit.

SUMMARY OF THE INVENTION AND ADVANTAGES

A remote control assembly includes a sheath having a longitudinal axis along a length thereof and defining an interior. A core element is disposed within the interior and extends along the length. A liner is disposed within the interior and coupled to the sheath. The liner surrounds the core element along the length. An outer layer comprising a first material is coupled to the sheath. An intermediate layer comprising a second material different from the first material is coupled to the outer layer. An inner layer comprising a third material different from the first and second materials and is coupled to the intermediate layer. The second material of the intermediate layer is comprising an elastomeric material.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Figure 1:
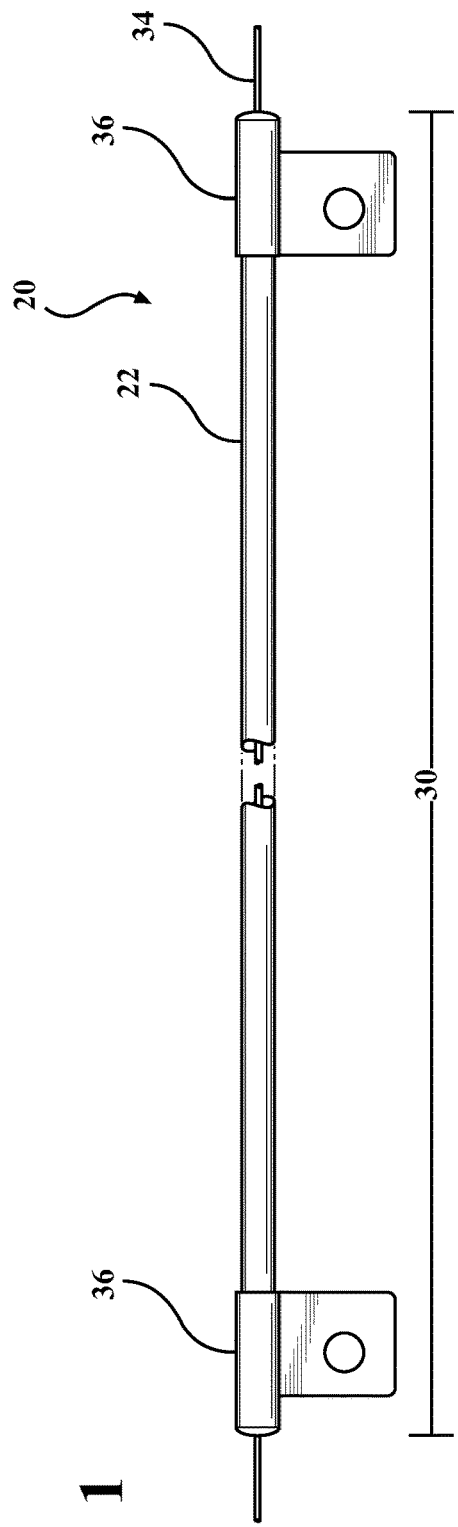
FIG. 1 is a fragmented side view of a remote control assembly.

With reference to the Figures, wherein like numerals indicate like parts throughout the several views, a remote control assembly is shown in FIG. 1. Typical uses of remote control assemblies includes, but is not limited to, automotive applications such as control of automatic transmissions, accelerators, clutches, cruise controls, HVAC vents, and the like.

Figure 2:
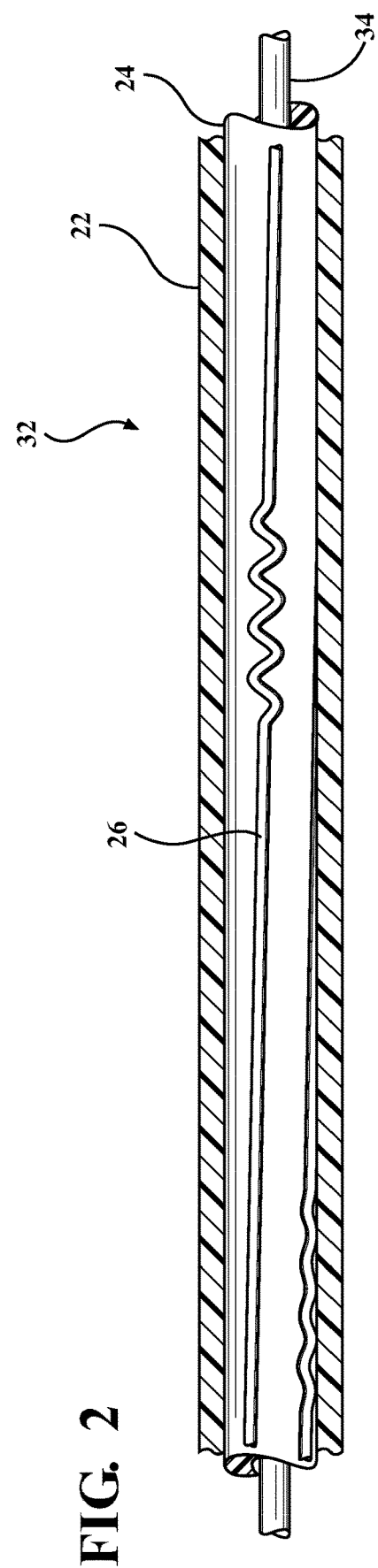
FIG. 2 is an enlarged fragmented side view of a portion of a cable of the remote control assembly with a sheath shown in cross-section.
Figure 3:
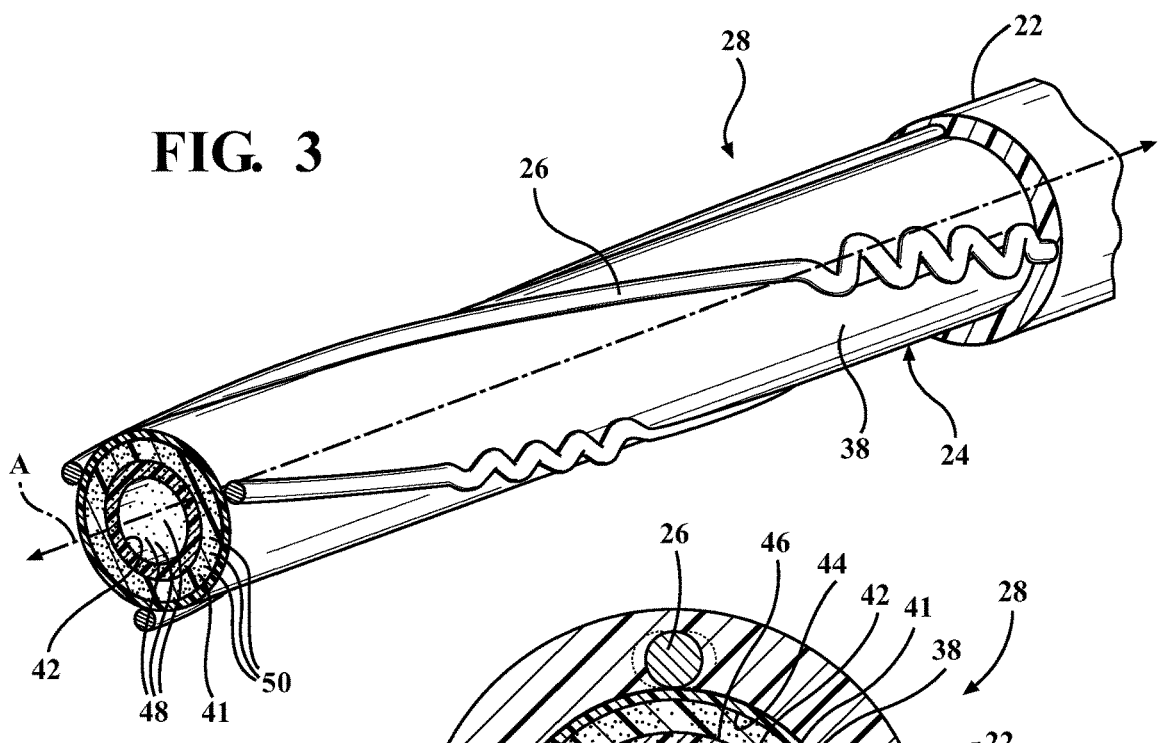
FIG. 3 is fragmented perspective view of a conduit with a portion of the sheath removed.

As best shown in FIGS. 2-3, the remote control assembly 20 includes a sheath 22, a liner 24, and at least one wire 26 disposed between the sheath 22 and the liner 24. The sheath 22, the liner 24, and the wire 26 collectively form a conduit 28. It is to be appreciated that other configurations of the wire 26 may be used, including any number of wires 26, without departing form the nature of the present invention. It is to be further appreciated that the sheath 22 and the liner 24 may collectively form the conduit 28 free of wires 26 without departing from the nature of the present invention.

The sheath 22 has a length 30 and a longitudinal axis A extending along the length 30. The sheath 22 defines an interior and the liner 24 is disposed within the interior and coupled to the sheath 22. The liner 24 defines an opening along the length 30.

As best shown in FIGS. 1-2, the remote control assembly 20 further includes a core element 34 disposed within the interior and extending along the length 30. More specifically, the liner 24 surrounds the core element 34 along the length 30, and the core element 34 is moveable within the opening defined by the liner 24. The liner 24 ensures flexibility and low friction support to permit the core element 34 to slidably move therein. The core element 34 may take various forms, but is shown in the Figures as a metal wire element that is attachable to control members for transmitting motion therebetween along longitudinal axis A. The conduit 28 and the core element 34 collectively form a cable 32.

The remote control assembly 20 further includes fittings 36 for supporting the cable 32, and in particular the conduit 28, therebetween. The cable 32 and the fittings 36 collectively form the remote control assembly 20. The fittings 36 may be fitted to the conduit 28 in any suitable manner, such as, but not limited to, overmolding to mechanically interlock the fittings 36 to the sheath 22 of the conduit 28 or using traditional fasteners without departing from the nature of the present invention. When the fittings 36 are overmolded onto the sheath 22 of the conduit 28, the fittings 36 may comprise polymeric or plastic materials; for example, nylon, Teflon, synthetic elastomers, polyvinyls, polyethylene (PE), polypropylene (PP), or their copolymers. It is to be appreciated that when the fittings 36 are fastened to the sheath 22 of the conduit 28 using traditional fasteners or any other suitable ways, the fittings 36 may comprise of a material other than the polymeric or plastic materials listed above. It is to be appreciated that the fittings 36 shown in FIG. 1 are schematic and other variations of the fittings 36 may be used without departing from the nature of the present invention.

In certain embodiments, the sheath 22 comprises one or more organic polymers. Although the sheath 22 may comprise one or more organic polymers, in one embodiment the sheath 22 comprises nylon. When the sheath 22 comprises nylon, various forms of nylon can be used. For example, the nylon may be a polyamide nylon, nylon 6-6, or combinations thereof. In certain embodiments, the sheath 22 comprises nylon and one or more organic polymers. In other embodiments, the sheath 22 consists of nylon (i.e., no other organic polymers are present in the sheath 22). When the sheath 22 consists of nylon, the sheath 22 may consist of polyamide nylon. Of course, when the sheath 22 consists of polyamide nylon, the sheath 22 may consist of nylon 6-6.

As best shown in FIGS. 3-7, the liner 24 includes an outer layer 38, an intermediate layer 41 coupled to the outer layer 38, and an inner layer 42 coupled to the intermediate layer 41 such that the intermediate layer 41 is disposed between the outer layer 38 and the inner layer 42. In one embodiment, as shown in FIGS. 3-7, the intermediate layer 41 is shown as a continuous ring extending along the length 30. In other words, the intermediate layer 41 completely surrounds the inner layer 42 such that the intermediate layer 41 is continuously disposed between the inner layer 42 and the outer layer 38. Other embodiments of the intermediate layer 41 will be described in further detail below.

Figure 4:
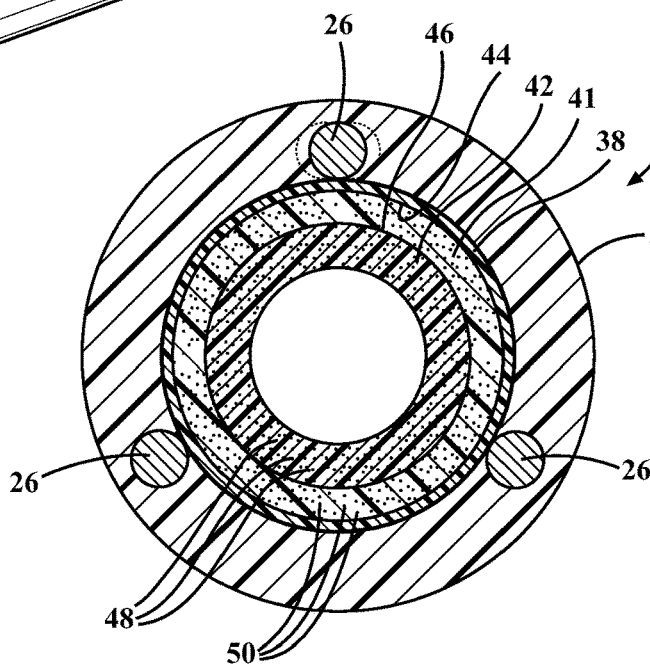
FIG. 4 is a front cross-sectional view of the conduit.
Figure 5:
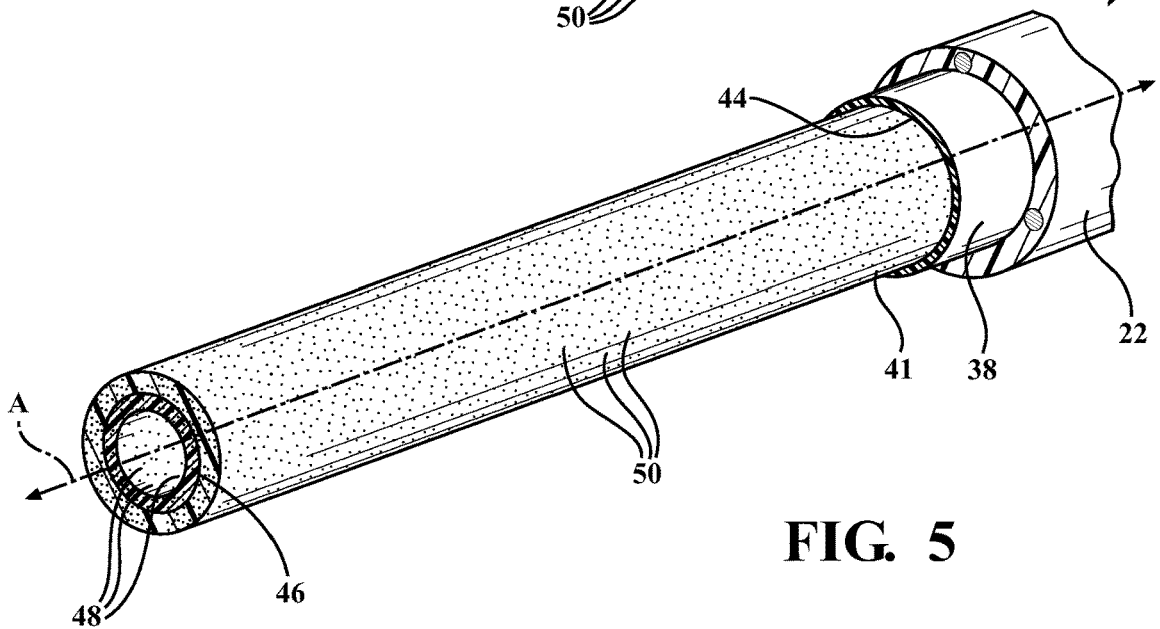
FIG. 5 is a fragmented perspective view of the conduit of FIG. 3.
Figure 6:
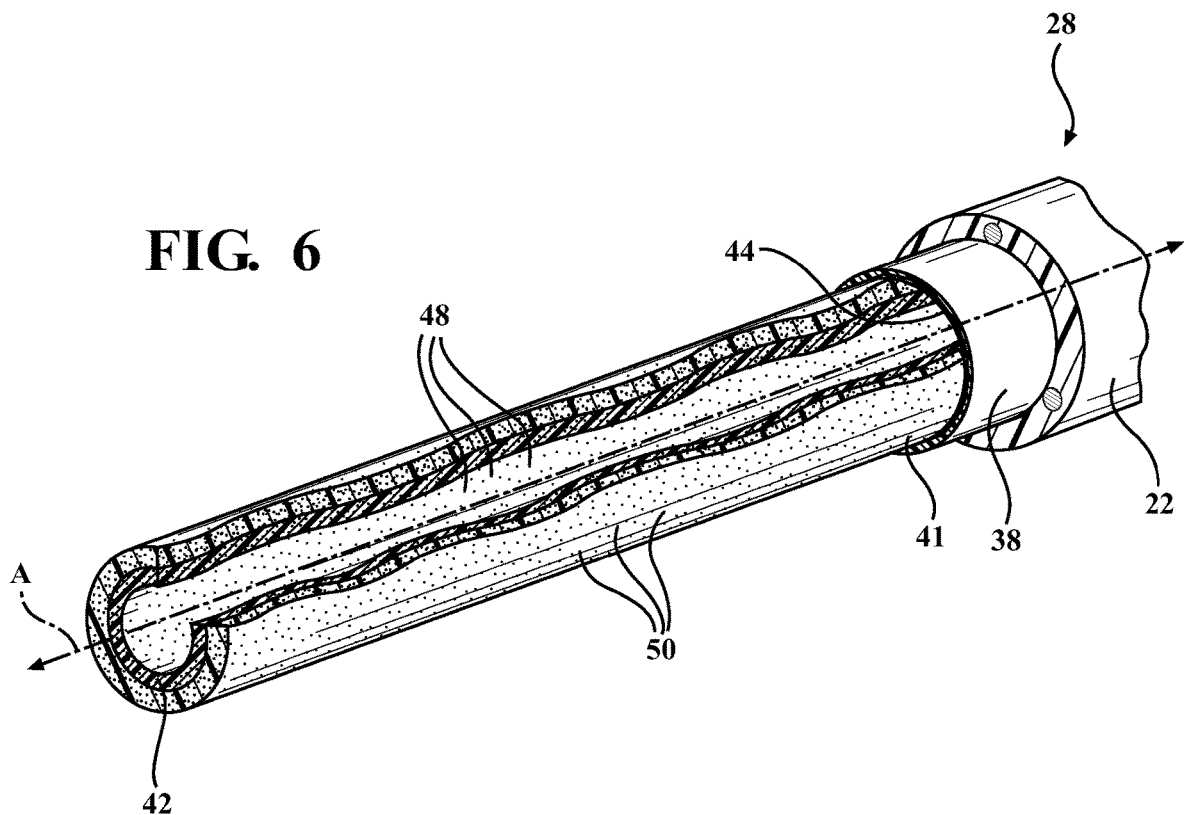
FIG. 6 is a fragmented perspective view of the conduit of FIG. 5 with a portion of an intermediate layer removed and a portion of an outer layer removed.
Figure 7:
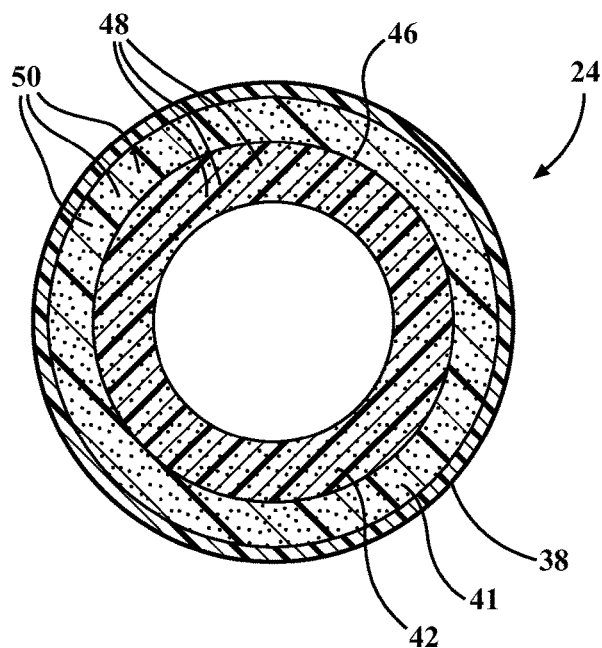
FIG. 7 is a front cross-sectional view of a liner of the conduit.
Figure 8:
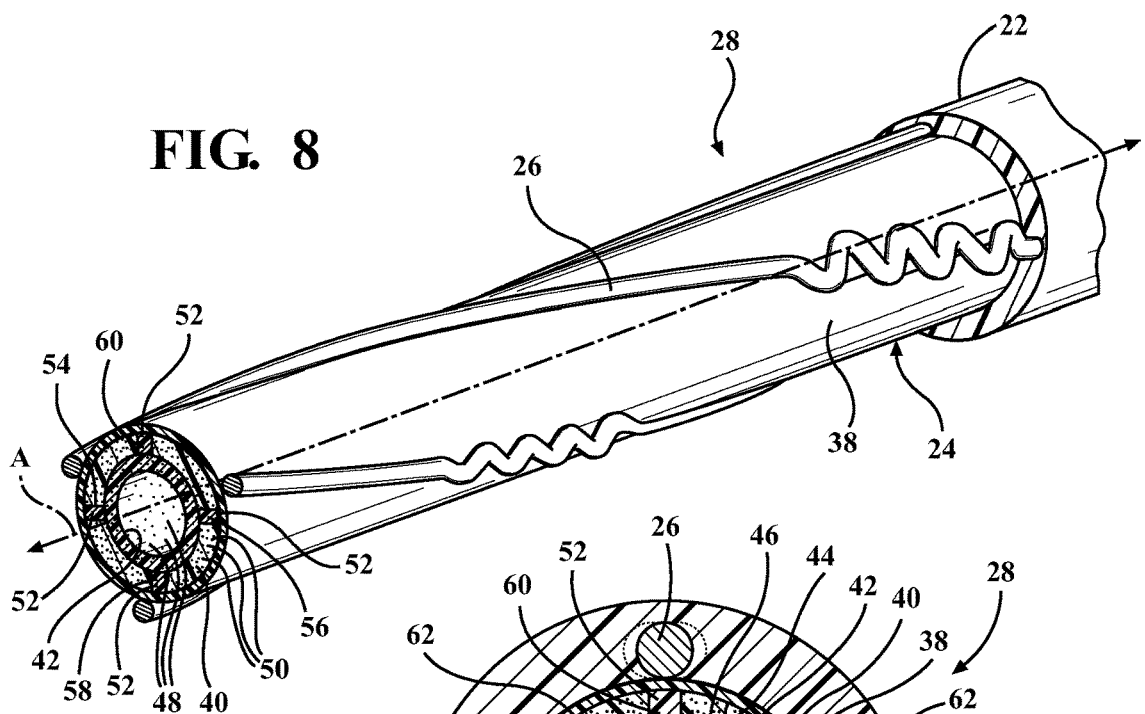
FIG. 8 is a fragmented perspective view of an alternative embodiment of the conduit of FIG. 3 with the liner including dividers.
Figure 9:
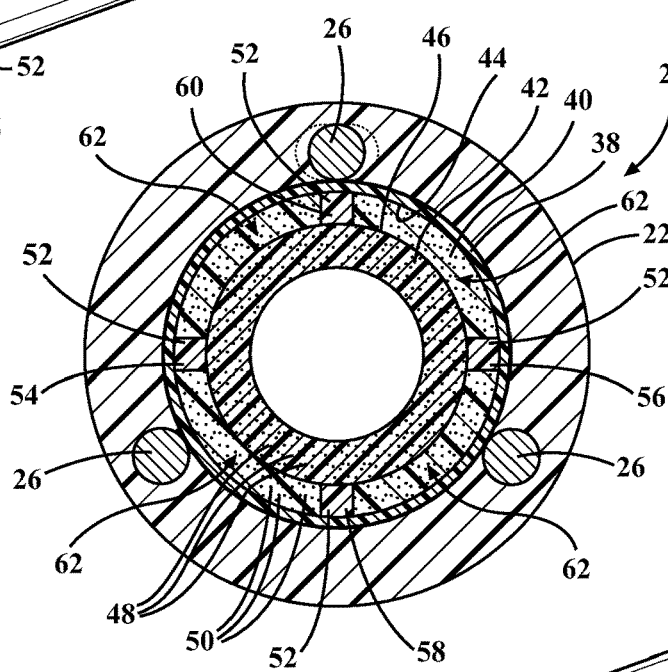
FIG. 9 is a front cross-sectional view of the conduit of FIG. 8.
Figure 10:
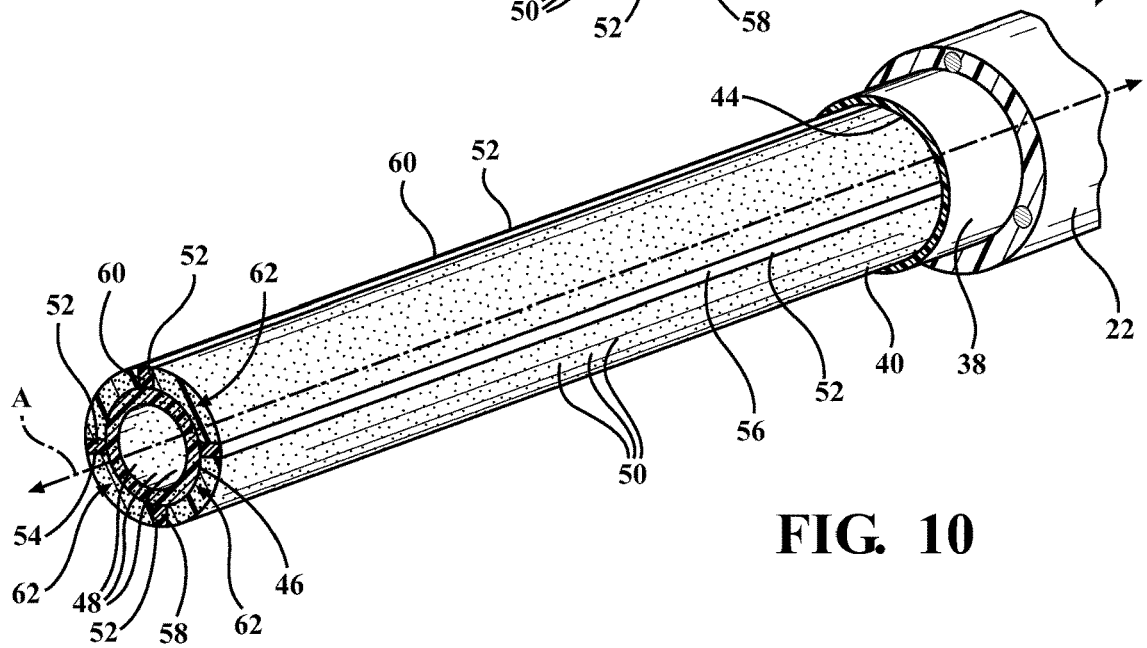
FIG. 10 is a fragmented perspective view of the conduit of FIG. 8.
Figure 11:
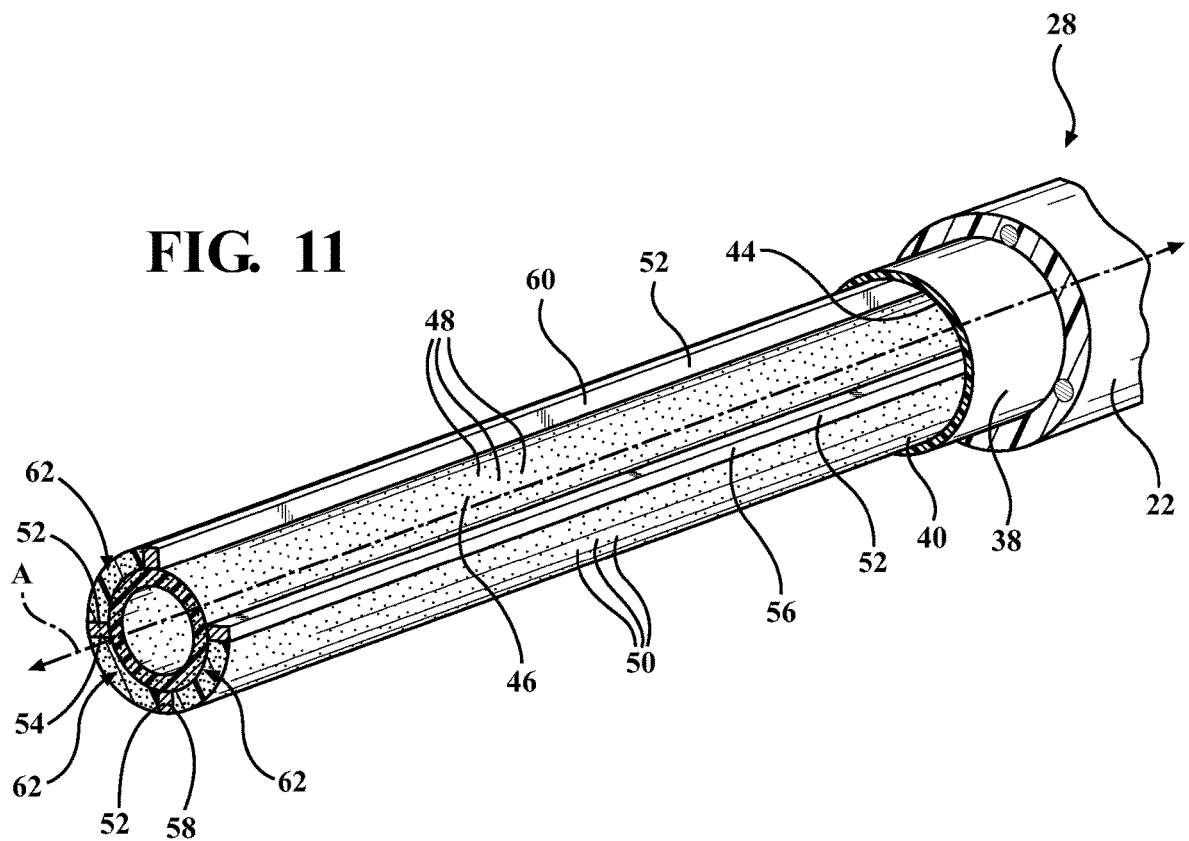
FIG. 11 is a fragmented perspective view of the conduit of FIG. 8 with a section of the intermediate layer removed and a portion of the outer layer removed.
Figure 12:
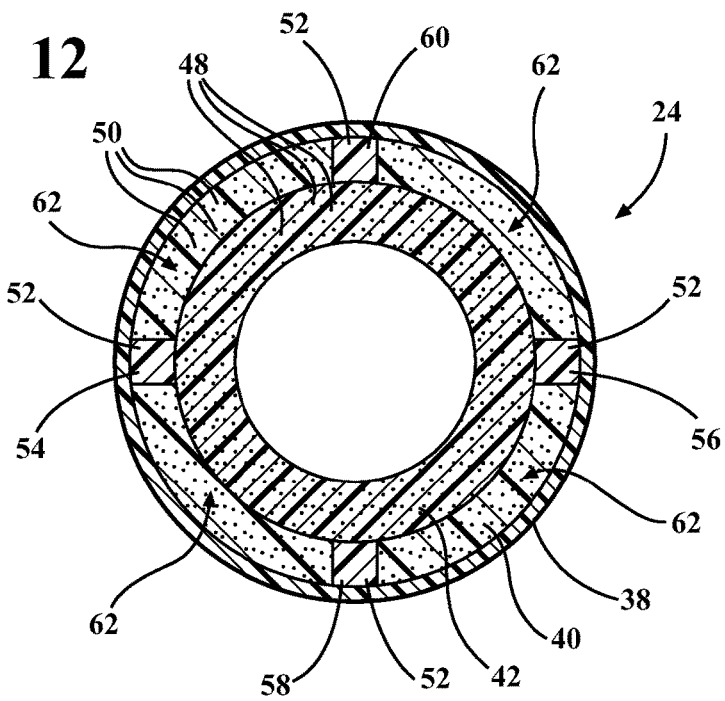
FIG. 12 is a front cross-sectional view of the liner of the conduit of FIG. 8.
Figure 13:
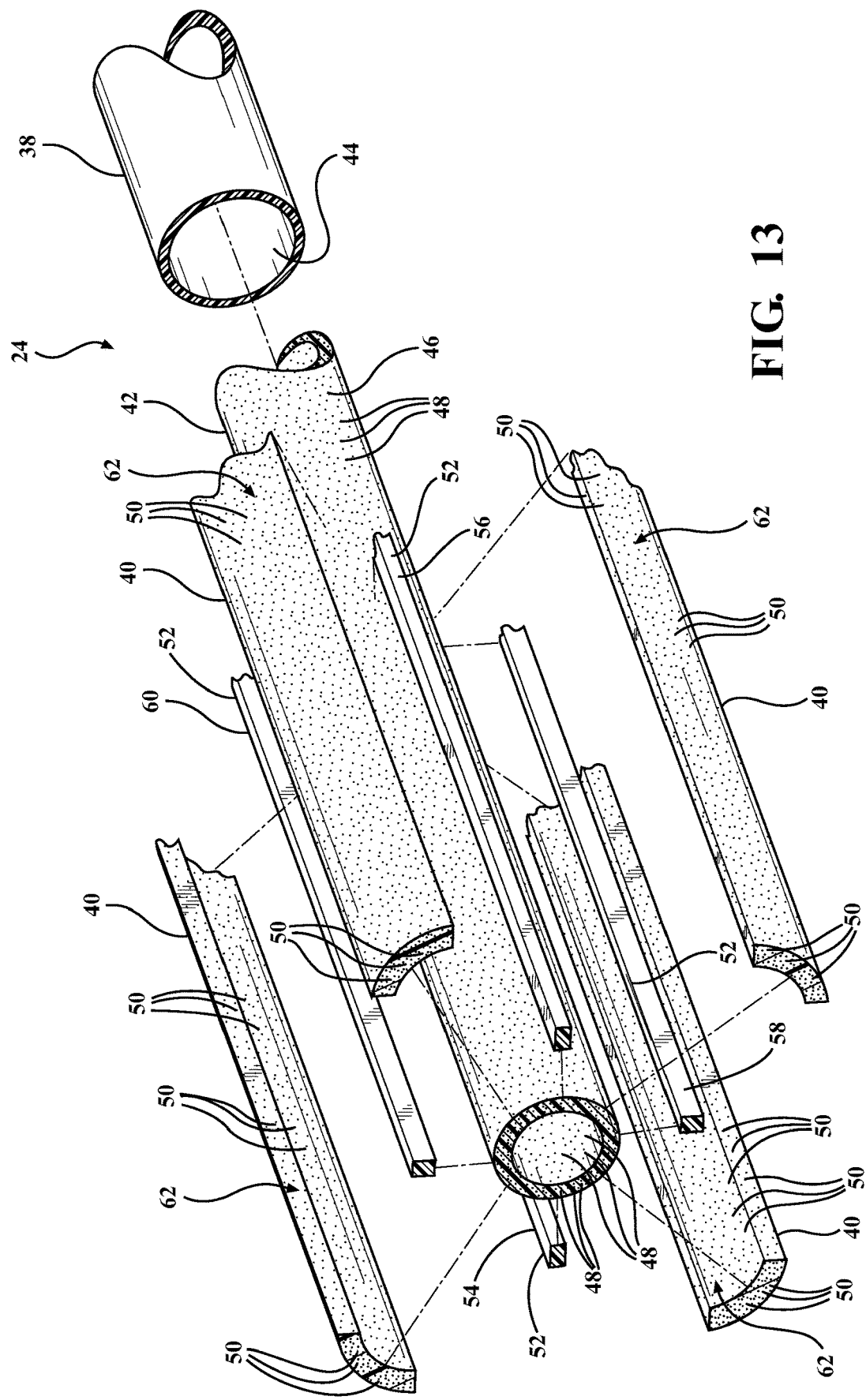
FIG. 13 is an exploded view of the liner of FIG. 12.

The outer layer 38 is coupled to the sheath 22 and the inner layer 42 defines the opening. The outer layer 38 has an interior surface 44 along the length 30 of the sheath 22 and the inner layer 42 has an exterior surface 46 along the length 30 of the sheath 22 facing the interior surface 44 such that the intermediate layer 41 is disposed between the exterior surface 46 and the interior surface 44, as best shown in FIG. 4. The outer layer 38 comprises a first material, the intermediate layer 41 comprises a second material different from the first material, and the inner layer 42 comprises a third material different from the first and second materials.

The first material of the outer layer 38 comprises one or more organic polymers. Although the first material comprises one or more organic polymers, in one embodiment the first material comprises nylon. When the first material comprises nylon, various forms of nylon can be used. For example, the nylon may be a polyamide nylon, nylon 6-6, or combinations thereof. In certain embodiments, the first material comprises nylon and one or more organic polymers. In other embodiments, the first material consists of nylon (i.e., no other organic polymers are present in the first material). When the first material consists of nylon, the first material may consist of polyamide nylon. Of course, when the first material consists of polyamide nylon, the first material may consist of nylon 6-6. Although not required, it is to be appreciated that the first material of the outer layer 38 of the liner 24 may comprise of any other suitable material in addition to nylon, such as, but not limited to, polyphenylsulfone (PPSU), polybutylene terephthalate (PBT), or polypropylene (PP), without departing from the nature of the present invention. In certain embodiments, the organic polymer of the first material may be selected from the group of nylon, polyamide nylon, nylon 6-6, polyphenylsulfone (PPSU), polybutylene terephthalate (PBT), polypropylene (PP), or combinations thereof.

The inner layer 42 of the liner 24 defines a plurality of inner pores 48. The third material of the inner layer 42 comprises one or more organic polymers. The one or more organic polymers may include any organic polymer suitable for forming the inner layer 42. As non-limiting examples, the one or more organic polymers may include polybutylene terephthalate (PBT), polyethylene (PE), or a combination thereof. It is to be appreciated that when the organic polymer includes polyethylene (PE), various forms of polyethylene (PE) may be used, such as high-density polyethylene (HDPE). In certain embodiments, the third material comprises more than one organic polymer. In other embodiments the first material consists of a single organic polymer (i.e., only one organic polymer is present in the first material). When the first material consists of a single organic polymer, the first material may consist of polybutylene terephthalate (PBT). Alternatively, when the first material consists of a single organic polymer, the first material may consist of polyethylene (PE). Of course, when the first material consists of polyethylene (PE), the first material may consist of high-density polyethylene (HDPE).

In other embodiments of the third material, the one or more organic polymers include one or more fluoropolymers. Although various fluoropolymers may be used, generally the one or more fluoropolymers includes polytetrafluoroethylene (PTFE). In certain embodiments, the third material comprises a fluoropolymer and one or more organic non-fluorinated polymers. In other embodiments, the third material consists of a single fluoropolymer (i.e., no other polymers are present in the third material). Of course, in this embodiment the third material may consist of polytetrafluoroethylene (PTFE). In yet other embodiments, the one or more organic polymers is selected from the group of polytetrafluoroethylene (PTFE), polybutylene terephthalate (PBT), polyethylene (PE), or combinations thereof.

The inner layer 42 has a lubricant disposed within the plurality of inner pores 48. The lubricant migrates within the plurality of inner pores 48 toward the core element 34, which helps lubricate the core element 34 to reduce noise and friction from the core element 34 contacting the inner layer 42. In one embodiment, the lubricant comprises a silicone-based oil. However, it is to be appreciated that the lubricant may be any other lubricant without departing from the nature of the present invention.

The second material of the intermediate layer 41 comprises an elastomeric material with the elastomeric material defining a plurality of intermediate pores 50. The elastomeric material of the intermediate layer 40 acts as a dampener between the outer layer 38 and the inner layer 42. The dampening characteristics of the intermediate layer 40 help reduce the vibrations transmitted through the liner 24 and, in turn, the conduit 28. Furthermore, the intermediate layer 40 has the lubricant described above disposed within the plurality of intermediate pores 50. The lubricant migrates from the plurality of intermediate pores 50 to the plurality of inner pores 48 for lubricating the core element 34, as described above. It is to be appreciated that the lubricant may only be disposed within the plurality of inner pores 48 without departing from the nature of the present invention. It is to be further appreciated that if the lubricant is initially only disposed within plurality of intermediate pores 50, the lubricant will migrate into the plurality of inner pores 48 such that the lubricant will lubricate the core element 34. When the lubricant is disposed within the plurality of inner pores 48, or disposed within the plurality of inner pores 48 and the plurality of intermediate pores 50, the need to apply lubricant to the core element 34 prior to manufacturing the cable 32 is eliminated. In other words, the lubricant disposed within the plurality of inner pores 48, or the plurality of inner pores 48 and the plurality of intermediate pores 50, is sufficient for lubricating the core element 34 during operation of the remote control assembly 20 without applying lubricant to the core element 34 prior to manufacturing the cable 32.

In an alternative embodiment of the invention, as shown in FIGS. 8-13, the intermediate layer 41 shown in FIGS. 3-7 is shown as intermediate layer 40. In this alternative embodiment, the liner 24 includes at least two dividers 52 disposed within the intermediate layer 40 with the at least two dividers 52 separating the intermediate layer 40 into at least two sections. The liner 24 has a thickness, and the at least two dividers 52 extend through the thickness of the liner 24.

The at least two dividers 52 comprise one or more organic polymers. Although the at least two dividers 52 may comprise one or more organic polymers, in one embodiment the at least two dividers 52 comprises nylon. When the at least two dividers 52 comprises nylon, various forms of nylon can be used. For example, the nylon may be a polyamide nylon, nylon 6-6, or combinations thereof. In certain embodiments, the at least two dividers 52 comprises nylon and one or more organic polymers. In other embodiments, the at least two dividers 52 consists of nylon (i.e., no other organic polymers are present in the at least two dividers 52). When the at least two dividers 52 consists of nylon, the at least two dividers 52 may consist of polyamide nylon. Of course, when the at least two dividers 52 consists of polyamide nylon, the at least two dividers may consist of nylon 6-6. It is to be appreciated that the at least two dividers 52 may comprise any other suitable material without departing from the nature of the present invention.

In one embodiment, the at least two dividers 52 are engaged with a portion of the exterior surface 46 of the inner layer 42 along a portion of the length 30. In other words, the at least two dividers 52 do not extend along the entire length 30. In another embodiment, the at least two dividers 52 are engaged with a portion of the interior surface 44 of the outer layer 38 along a portion of the length 30. In other words, the at least two dividers 52 do not extend along the entire length 30. In another embodiment, the at least two dividers 52 are engaged with a portion of the exterior surface 46 of the inner layer 42 and a portion of the interior surface 44 of the outer layer 38. In other words, the at least two dividers 52 do not extend along the entire length 30, but are engaged with a portion of both the interior surface 44 and the exterior surface 46. In another embodiment, the at least two dividers 52 are engaged with the exterior surface 46 of the inner layer 42 and the interior surface 44 of the outer layer 38 along the entire length 30. Said differently, the at least two dividers 52 extend through the intermediate layer 40 and abut both the outer layer 38 and the inner layer 42 along the length 30. It is to be appreciated that the at least two dividers 52 may be integrally formed with the outer layer 38 such that the outer layer 38 and the at least two dividers 52 are a single component extending along the length 30.

When the at least two dividers 52 are engaged with the exterior surface 46 of the inner layer 42 and the interior surface 44 of the outer layer 38 along the length 30, the intermediate layer 40 is separated into the at least two sections 62. In one embodiment, the at least two dividers 52 are further defined as a first divider 54 and a second divider 56 with the first divider 54 and the second divider 56 equally spaced from on another about the exterior surface 46 and interior surface 44. In other words, the first divider 54 and the second divider 56 are 180 degrees apart from one another about the exterior surface 46 and the interior surface 44. It is to be appreciated that the first divider 54 and the second divider 56 may be less or more than 180 degrees apart from one another about the exterior surface 46 and the interior surface 44 without departing from the nature of the present invention.

Dividing the intermediate layer 40 into the at least two sections helps localize vibrations caused by engines, transmissions, and/or movement of the core element 34. Furthermore, dividing the intermediate layer 40 into the at least two sections helps with flexibility of the liner 24 and, in turn, the conduit 28.

In one embodiment, the at least two dividers 52 are further defined as at least four dividers 52. In this embodiment, the at least four dividers 52 are engaged with the exterior surface 46 and the interior surface 44 along the length 30. The at least four dividers 52 are equally spaced from one another about the exterior surface 46 and the interior surface 44 with the at least four dividers 52 separating the intermediate layer 40 into at least four sections 62. When the at least four dividers 52 are equally spaced from one another about the exterior surface 46 and the interior surface 44 the intermediate layer 40 is divided into at least four sections 62 equally separated along the length 30. For example, as shown in FIGS. 8-13, the at least four dividers are shown as the first divider 54, the second divider 56, a third divider 58, and a fourth divider 60 with the first divider 54, the second divider 56, the third divider 58, and the fourth divider 60 separating the intermediate layer into four sections 62.

It is to be appreciated that the at least four dividers 52 may engage with only a portion of the interior surface 44 and/or exterior surface 46. In other words, it is to be appreciated that the at least four dividers 52 may not extend along the entire length 30. It is to be further appreciated that the at least four dividers 52 may divide the intermediate layer 40 into unequal sections 62 without departing from the nature of the present invention. It is to be further appreciated that the at least four dividers 52 may be integrally formed with the outer layer 38 such that the outer layer 38 and the at least four dividers 52 are a single component extending along the length 30.

Dividing the intermediate layer 40 into the at least four sections 62 can help localize vibrations caused by engines, transmissions, and/or movement of the core element 34. Furthermore, dividing the intermediate layer 40 into the at least four sections can help with flexibility of the liner 24 and, in turn, the conduit 28.

It is to be appreciated that configurations of the liner 24 and the sheath 22 throughout the Figures are merely illustrative, and that various components of the liner 24 and the sheath 22 may not be drawn to scale. For example, the liner 24 may have a thickness that is greater or less than the thickness shown throughout the Figures. Specifically, the outer layer 38, the intermediate layer 40, and the inner layer 42 may each have a thickness that is greater or less than the thickness shown throughout the Figures. Similarly, the sheath 22 may have a thickness that is greater or less than the thickness as shown throughout the Figures. Likewise, the dividers 52 may have a thickness or width that is less than or greater than the thickness and width shown throughout the Figures.

The invention has been described in an illustrative manner, and it is to be understood that the terminology that has been used is intended to be in the nature of words of description rather than of limitation. Many modifications and variations of the present invention are possible in light of the above teachings, and the invention may be practiced otherwise than as specifically described.

What is claimed is:

1. A remote control assembly for transmitting motion along a path, said remote control assembly comprising:
    a sheath having a longitudinal axis along a length thereof and defining an interior;
    a core element disposed and moveable along said axis within said interior and extending along said length for transmitting motion along the path;
    a liner disposed within said interior and coupled to said sheath and surrounding said core element along said length while permitting movement of said core element along said axis relative to said liner, said liner including:
        an outer layer comprising a first material and coupled to said sheath,
        an intermediate layer comprising a second material different from said first material and coupled to said outer layer, and
        an inner layer comprising a third material different from said first and second materials and coupled to said intermediate layer,
        wherein said second material of said intermediate layer comprises an elastomeric material,
        wherein said inner layer defines a plurality of inner pores with said inner layer having lubricant disposed within said plurality of inner pores to lubricate said core element during movement along said axis,
        wherein said intermediate layer defines a plurality of intermediate pores with said intermediate layer having lubricant disposed within said plurality of intermediate pores with said lubricant migrating from said plurality of intermediate pores to said plurality of inner pores to lubricate said core element during movement along said axis,
        wherein said first material of said outer layer comprises nylon, and
        wherein at least a portion of said sheath is in direct contact with said outer layer; and
    at least one wire disposed between said sheath and said liner.

2. The remote control assembly as set forth in claim 1 wherein said nylon of said first material is a polyamide nylon.

3. The remote control assembly as set forth in claim 1 wherein said third material of said inner layer comprises an organic polymer selected from the group of polytetrafluoroethylene, polybutylene terephthalate, polyethlylene, or combinations thereof.

4. The remote control assembly as set forth in claim 1 wherein said sheath comprises nylon.

5. The remote control assembly as set forth in claim 4 wherein said nylon is a polyamide nylon.

6. The remote control assembly as set forth in claim 1 wherein said lubricant comprises silicone-based oil.

7. The remote control assembly as set forth in claim 1 wherein said liner further includes at least two dividers disposed within said intermediate layer with said at least two dividers separating said intermediate layer into at least two sections.

8. The remote control assembly as set forth in claim 7 wherein said intermediate layer has a thickness with said at least two dividers extending through said thickness.

9. The remote control assembly as set forth in claim 7 wherein said inner layer has an exterior surface along said length with said at least two dividers engaged with a portion of said exterior surface.

10. The remote control assembly as set forth in claim 7 wherein said outer layer has an interior surface along said length with said at least two dividers engaged with a portion of said interior surface.

11. The remote control assembly as set forth in claim 10 wherein said at least two dividers are engaged with said exterior surface and said interior surface along said length.

12. The remote control assembly as set forth in claim 10 wherein said at least two dividers are further defined as a first divider and a second divider with said first divider and said second divider equally spaced from one another about said exterior and interior surfaces.

13. The remote control assembly as set forth in claim 10 wherein said at least two dividers are further defined as at least four dividers engaged with said exterior surface and said interior surface along said length.

14. The remote control assembly as set forth in claim 7 wherein said at least two dividers comprises nylon.

15. The remote control assembly as set forth in claim 1 wherein said at least one wire is in direct contact with said sheath and said outer layer.

16. A conduit for use in a remote control assembly with the remote control assembly including a core element, said conduit comprising:
    a sheath having a longitudinal axis along a length thereof and defining an interior;
    a liner disposed within said interior and coupled to said sheath along said length, said liner including:
        an outer layer comprising a first material and coupled to said sheath,
        an intermediate layer comprising a second material different from said first material and coupled to said outer layer, and
        an inner layer comprising a third material defining a plurality of inner pores with said third material different from said first and second materials and coupled to said intermediate layer, and said inner layer having lubricant disposed within said plurality of inner pores with said lubricant migrating within said pores for lubricating the core element,
        wherein said intermediate layer defines a plurality of intermediate pores with said intermediate layer having lubricant disposed within said plurality of intermediate pores with said lubricant migrating from said plurality of intermediate pores to said plurality of inner pores for lubricating the core element,
        wherein said first material of said outer layer comprises nylon, and
        wherein at least a portion of said sheath is in direct contact with said outer layer; and
    at least one wire disposed between said sheath and said liner.

17. The conduit as set forth in claim 16 wherein said at least one wire is in direct contact with said sheath and said outer layer.

* * * * *